US012164422B2

(12) United States Patent
Sheridan (10) Patent No.: US 12,164,422 B2
(45) Date of Patent: Dec. 10, 2024

(54) ZONED NAMESPACES FOR COMPUTING DEVICE MAIN MEMORY

(71) Applicant: Micron Technology, Inc., Boise, ID (US)

(72) Inventor: Patrick Michael Sheridan, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 17/980,919

(22) Filed: Nov. 4, 2022

(65) Prior Publication Data

US 2023/0222058 A1 Jul. 13, 2023

Related U.S. Application Data

(60) Provisional application No. 63/297,555, filed on Jan. 7, 2022.

(51) Int. Cl.
*G06F 12/02* (2006.01)
*G06F 12/06* (2006.01)
*G06F 13/16* (2006.01)

(52) U.S. Cl.
CPC ...... *G06F 12/0638* (2013.01); *G06F 12/0238* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2002/0124143 A1* | 9/2002 | Barroso | ............... | G06F 12/0817 |
| | | | | 711/E12.027 |
| 2015/0189039 A1* | 7/2015 | Cheng | ................... | H04L 67/568 |
| | | | | 709/216 |
| 2019/0294554 A1* | 9/2019 | Bryant | ................ | G06F 12/0846 |

FOREIGN PATENT DOCUMENTS

CN 116414725 7/2023

OTHER PUBLICATIONS

Bjorkling, Matias, "From Open-Channel SSDs to Zoned Namespaces", Western Digital [Online]. Retrieved from the Internet: URL: https://www.usenix.org sites default files conference protected-files nsdi19_slides_bjorling.pdf, (Jan. 23, 2019), 18 pgs.

Bjorling, Matias, "New NVMe Specification Defines Zoned Namespaces ZNS as Go To Industry Technology", [Online] https://nvmexpress.org new-nvmetm-specification-defines-zoned-namespaces-zns-as-go-to-industry-technology , (Accessed on May 11, 2021), 5 pgs.

(Continued)

*Primary Examiner* — Charles J Choi
(74) *Attorney, Agent, or Firm* — Schwegman Lundberg & Woessner, P.A.

(57) ABSTRACT

Disclosed in some examples are methods, systems, memory devices, memory controllers, and machine-readable mediums which provide for reserving physical memory device resources to specific execution units. Execution units may include processes, threads, virtual machines, functions, procedures, or the like. Physical memory device resources may include channels, modules, ranks, banks, bank groups, and the like. For example, a physical memory device resource that is reservable may be a smallest unit that allows for parallel access with another of the same size unit.

16 Claims, 8 Drawing Sheets

(56) References Cited

OTHER PUBLICATIONS

Farshin, Alireza, "Make the Most out of Last Level Cache in Intel Processors", [Online]. Retrieved from the Internet: URL: https: dl.acm.org doi pdf 10.1145 3302424.3303977, (Accessed on May 11, 2021), 17 pgs.

* cited by examiner

ZONED NAMESPACES FOR COMPUTING DEVICE MAIN MEMORY

PRIORITY APPLICATION

This application claims the benefit of priority to U.S. Provisional Application Ser. No. 63/297,555, filed Jan. 7, 2022, which is incorporated herein by reference in its entirety.

GOVERNMENT RIGHTS

This invention was made with United States Government support under Contract Number DE-AC05-000R2275 awarded by the Department of Energy. The United States Government has certain rights in this invention.

TECHNICAL FIELD

Embodiments pertain to memory devices. Some embodiments relate to main memory devices, such as Dynamic Random-Access Memory (DRAM) devices. Some embodiments relate to reservations for physical portions of main memory devices.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory may retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices that store data may do so using a plurality of memory cells. For a volatile memory device, the volatile memory may organize memory cells into a hierarchical structure of physical memory resources. For example, cells may be organized into arrays of rows and columns; each array may be grouped with other arrays into banks, multiple banks may be grouped together to form bank groups, bank groups may be grouped into a single chip, chips may be grouped to form modules, ranks may be defined as one side of a chip, and the like. Modern memory device design allows parallel operations across certain levels of this organization. For example, two operations may be executed in parallel across two different banks of memory cells.

Current memory assignment algorithms do not consider the physical structure of the memory devices to maximize the number of parallel reads and to reduce contention. For example, the memory management system may assign memory addresses that map to a same physical memory resource to different processes. Depending on the access patterns of these addresses, this may lead to contention for these resources and may lower the performance of the processes. Stated more generally, multiple execution units that are accessing physical memory resources in conflicting ways may cause contention. These conflicting accesses can also result in thrashing when bank conflicts require a row to be repeatedly opened and closed as different applications require access to different rows. This results in increased memory latency and increased energy expenditures.

The mapping of a physical memory address to a given physical location in DRAM is typically governed by the CPU's memory management unit, is fixed in silicon, and often not documented in processor datasheets. Clever physical address decoding along with intelligent memory controller scheduling can partially mitigate this contention for certain access patterns, but without the ability to partition resources, it cannot be eliminated entirely and is fixed without knowledge of the specific access patterns that will be seen. In addition, while some current systems may map an execution unit's memory into contiguous physical memory addresses, this does not guarantee that the execution unit has exclusive access to any physical resources such that other execution units are not placed in those physical resources.

Disclosed in some examples are methods, systems, memory devices, memory controllers, and machine-readable mediums which provide for reserved physical memory device resources for specific execution units. Execution units may include processes, threads, virtual machines, functions, procedures, or the like. Physical memory device resources may include channels, modules, ranks, banks, bank groups, and the like. For example, a physical memory device resource that is reservable may be a smallest unit that allows for parallel access with another of the same size unit.

In some examples, to implement these reservations, the memory system may utilize a mapping between physical memory addresses and physical memory resources. The memory system may use this mapping to allow one or more execution units to "reserve" one or more physical memory resources such that no other execution unit may access that particular physical memory resource by reserving the physical addresses corresponding to the reserved physical memory resources. Memory used by the execution unit may then be allocated within the reserved physical memory resource(s) by allocating the reserved physical addresses. In systems where virtual addresses are used, virtual addresses of the execution unit may be mapped to those reserve physical memory addresses, and thus the reserved physical memory resources (e.g., in a memory management unit (MMU)). Other virtual addresses from the same or other execution units may not be mapped to these reserved addresses. In some examples, an entire memory space of an execution unit may be reserved, but in other examples only certain memory locations of an execution unit may be reserved.

This solves the technical problem of contention for physical memory resources by the technical solution of reserving, for a particular execution unit, physical addresses associated with the physical memory resources. This prevents thrashing and memory contention. This is done using technical solutions of exposing the mapping between physical resources and physical addresses and mapping virtual addresses to physical resources.

Figure 1:
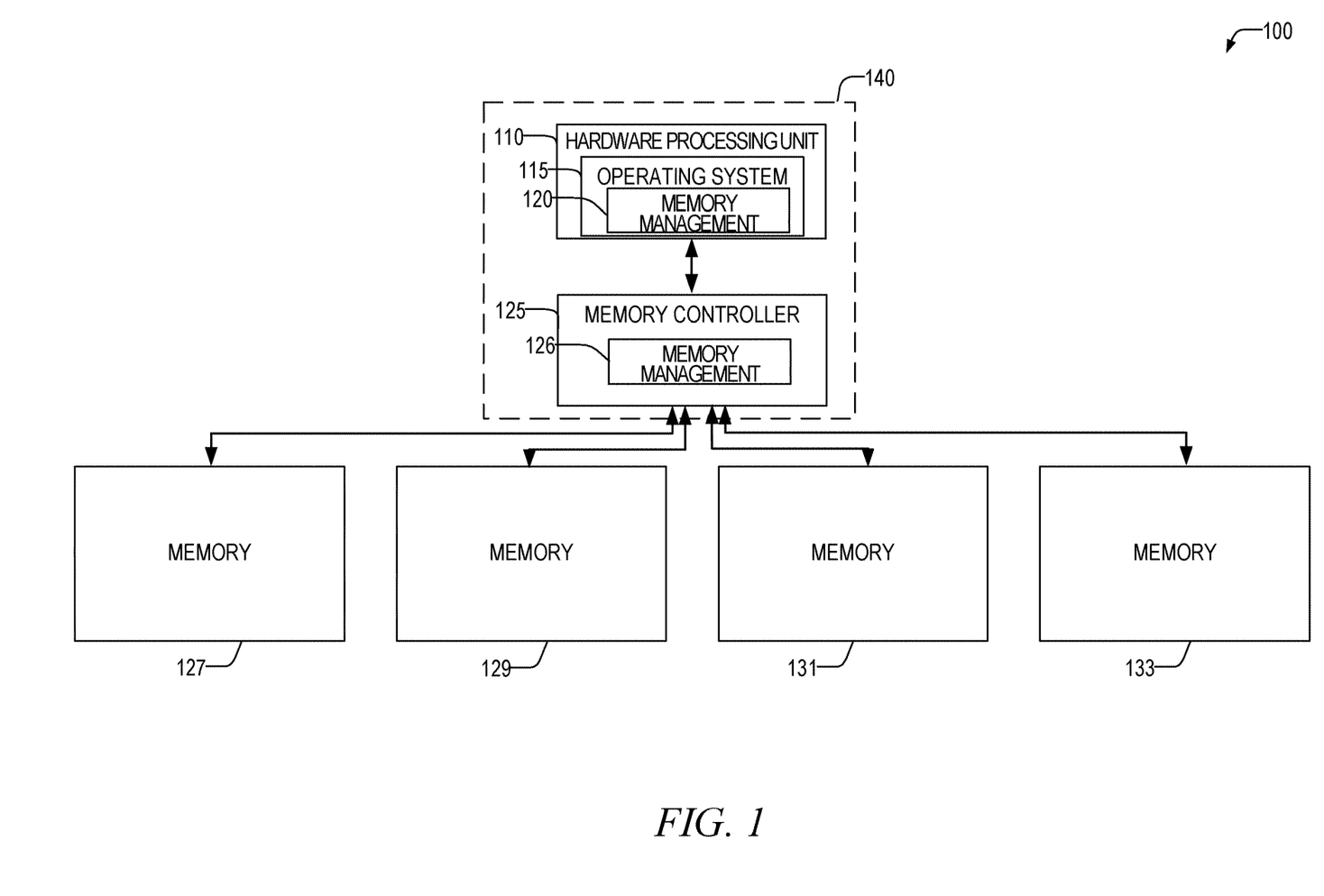
FIG. 1 illustrates an example embodiment of a portion of a computing system including a memory system such as a random-access memory (RAM) system according to some examples of the present disclosure.

FIG. 1 illustrates an example embodiment of a portion of a computing system 100 including a memory system such as a random-access memory (RAM) system according to some examples of the present disclosure. A hardware processing unit 110 may execute instructions of one or more execution units. Execution units may be related sets of instructions, such as an application, a process, a thread, a virtual machine, or the like. Instructions executed by the hardware processing unit 110 may also include an operating system 115. The operating system 115 may provide an interface between the hardware of the computer system and other execution units such as applications, processes, or the like. Operating system 115 may schedule instructions of execution units for execution by the hardware processing unit 110, arbitrate access to hardware resources between different execution units, control the states of the hardware processing unit 110, handle interrupts, and manage system memory. As part of this management, the operating system may include a memory management component 120. Memory management component 120 works with a memory controller 125 and memory management component 126 of memory controller 125 to manage the memory system. For example, to allocate memory, map virtual addresses in an execution unit's virtual address space to physical addresses, convert physical addresses to specific channels, ranks, bank groups, banks, rows, and columns on the physical memory resources and to manage the flow of data going to and from the memory modules 127, 129, 131, and 133. In some examples, the memory controller 125 may be a separate chip or in other examples, may be integrated into a same die or package as the hardware processing unit 110. In still other examples, the memory controller, hardware processing unit 110, and/or one or more of the memory modules 127, 129, 131, and 133 may be on different chiplets and may communicate using a packet-based interface.

Memory controller 125, or memory management component 120 may read and write to the memory modules, such as memory modules 127, 129, 131, and 133 and to refresh the memory modules to prevent leakage. For example, the memory modules 127, 129, 131, and 133 may be refreshed often, such as every 64 milliseconds. In some examples, the memory modules 127, 129, 131, and 133 may be on one or more different busses to enable parallel access. In some examples, the memory controller 125 or memory management component 120 may read a physical memory address of the memory operation to determine the channel, rank, memory module, bank group, bank, row, and column of the memory operation. The memory operation is then directed to memory modules 127, 129, 131, and 133. In some examples, a hardware memory management unit (MMU) may convert virtual addresses to physical addresses. In some examples, the memory management component of the operating system 115 may write to and read from the conversion tables of the MMU.

As can be appreciated from the above description, the management of the main memory may, depending on the implementation, be controlled by a combination of hardware (e.g., the hardware processing unit 110, and the memory controller 125) and software (e.g., the operating system 115). In FIG. 1, these components are referred to collectively as a memory management system 140. The exact distribution of management functions between the hardware processing unit 110 and the memory controller as well as between the hardware and software functions may vary based upon the system and the implementation. One of ordinary skill in the art will appreciate that various different implementations are possible, and thus, the operations described herein will be described as being implemented by the memory management system, while the exact implementation may be performed by hardware, software, or a combination of both hardware and software and those functions may be spread across multiple hardware resources.

The main memory system in FIG. 1 may be organized into a hierarchy. For example, one or more channels may include one or more ranks. Ranks may be sub-units of a memory module (e.g., such as memory modules 127, 129, 131, and 133) that share the same address and data buses and are selected by the chip select in low-level addressing. Memory modules may include multiple memory chips and may include multiple ranks (e.g., one rank on each side of the memory module). Memory modules may include multiple memory chips that are component integrated circuits. Each chip may include one or more bank groups and banks.

Memory modules 127, 129, 131, and 133 may be Single Inline Memory Modules (SIMMS), Dual Inline Memory Modules (DIMMS), or the like. Memory modules 127, 129, 131, and 133 may include one or more Dynamic Random-Access Memory (DRAM), such as Synchronous Dynamic Random-Access Memory (SDRAM), a Double Data Rate SDRAM (DDR), or the like. As previously noted, each memory module may include one or more memory chips, each memory chip may include an array of memory cells, the memory cells may each include a capacitor that store charge representing one or more "bits." The memory cells are periodically "refreshed" to ensure that the data stored therein is not lost due to discharge.

Figure 2:
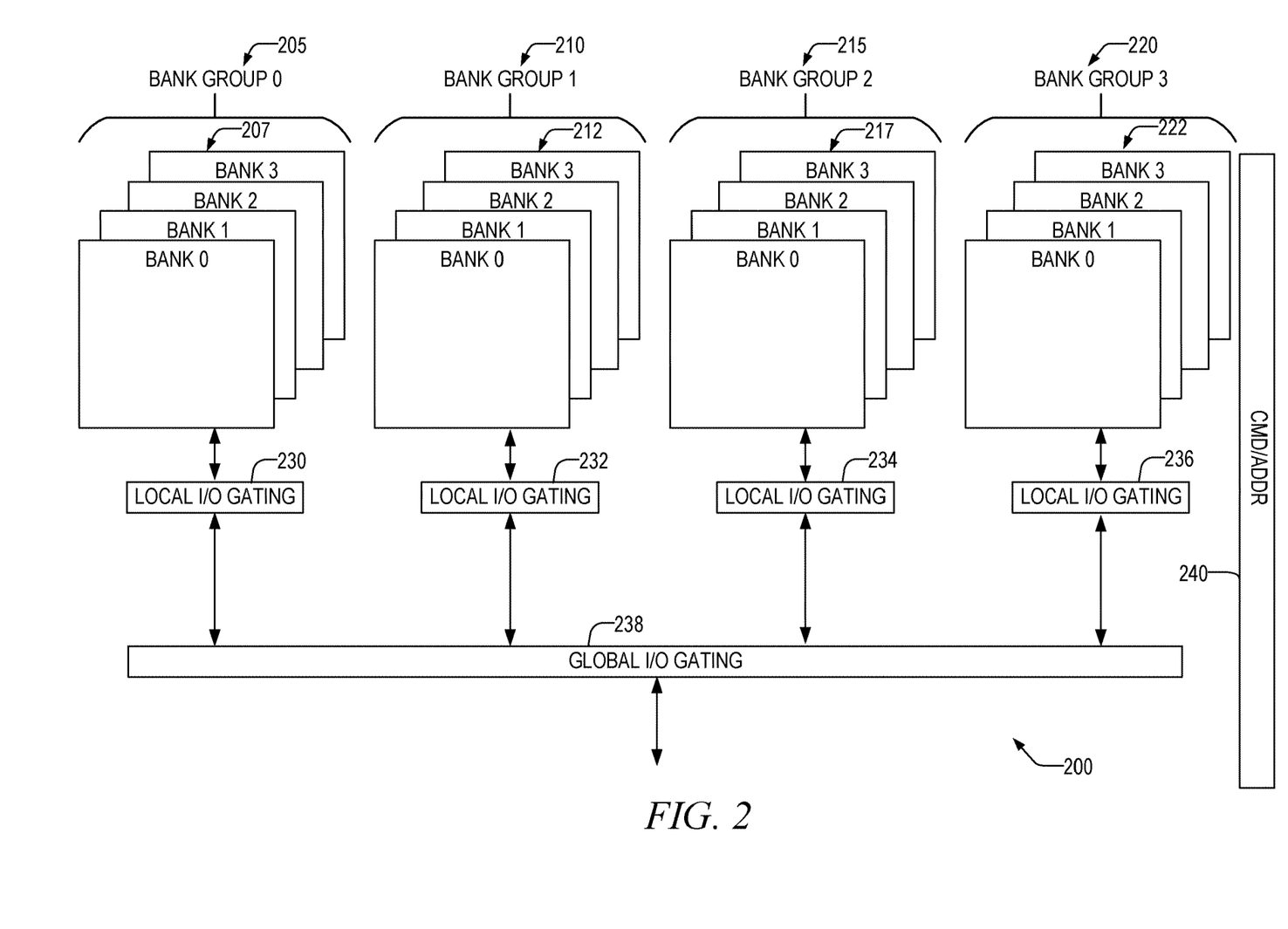
FIG. 2 illustrates a diagram of a logical organization of a memory chip of a memory module according to some examples of the present disclosure.

FIG. 2 illustrates a diagram 200 of a logical organization of a memory chip of a memory module according to some examples of the present disclosure. Banks may be organized into a plurality of bank groups. As shown in FIG. 2, there are four bank groups 205, 210, 215, and 220. Each bank group may have a plurality of banks. For example, as shown in FIG. 2, four banks 207 in bank group 0, four banks 212 in bank group 1, four banks 217 in bank group 2, and four banks 222 in bank group 3. Each bank group includes local I/O gating 230, 232, 234, and 236 that routes input and output to and from the bank gates to and from the global I/O gating 238. Command and address circuitry 240 routes commands and addresses from a memory controller to each bank group.

Figure 3:
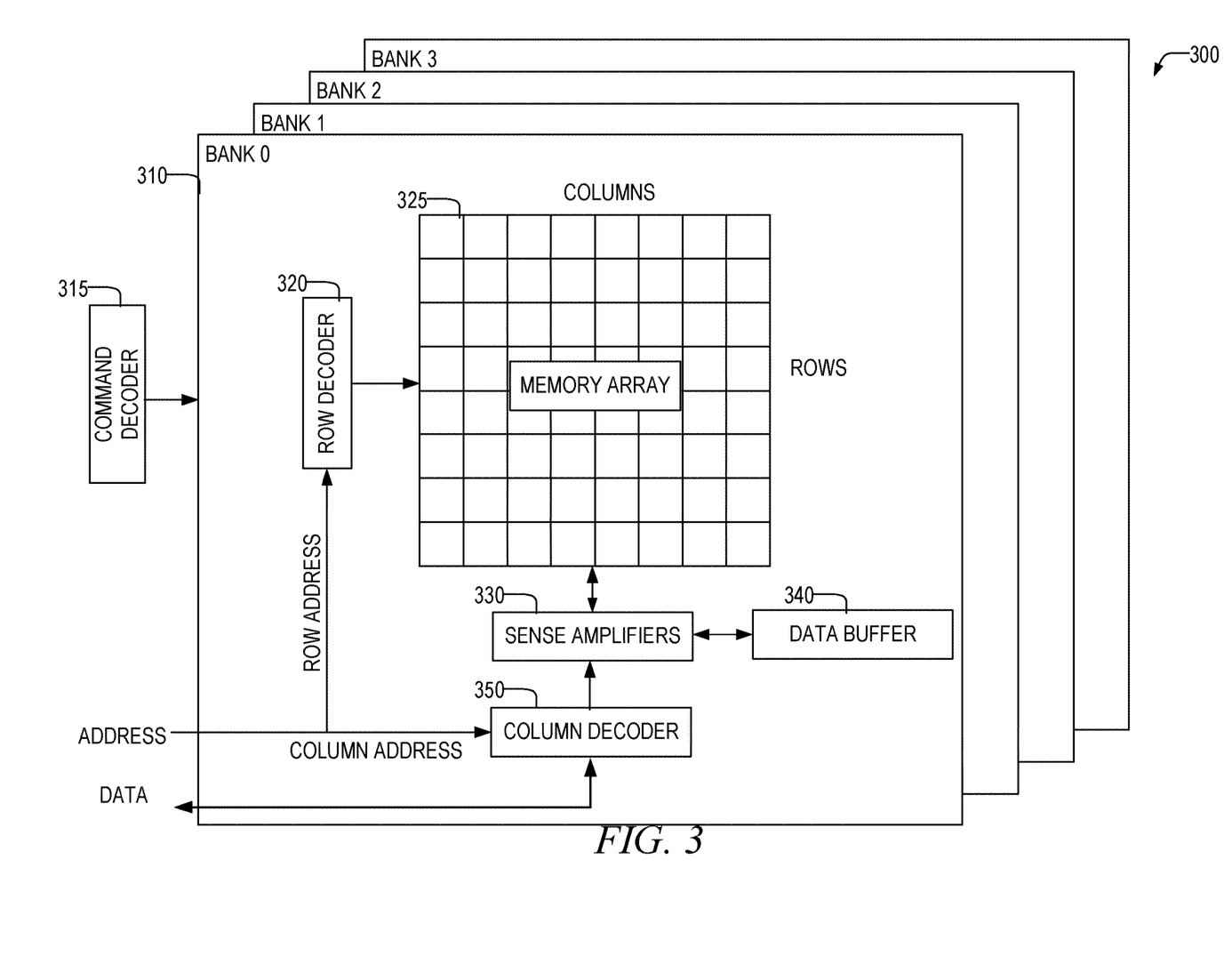
FIG. 3 illustrates a diagram of a memory bank according to some examples of the present disclosure.

FIG. 3 illustrates a diagram 300 of a memory bank 310 according to some examples of the present disclosure. The memory array 325 comprises memory cells that store data. The memory array may be divided into rows and columns. An address is decoded into a row number by the row decoder 320, and into a column by the column decoder 350. To read or write a value, a row of the memory array 325 is "opened" and the values of the row are read into the data buffer 340 by sense amplifiers 330. One or more columns may then be read out for a read operation or written to the memory array during a write operation. Once operations have concluded for that row, the row is closed. Command decoder 315 may decode one or more commands and perform the requested operation.

As previously noted, the mapping of a physical memory address to a given location in DRAM is typically governed by the memory management system. Clever physical address decoding along with intelligent memory controller scheduling can partially mitigate contention for certain access patterns, without the ability to partition resources, it cannot be eliminated entirely and is fixed without knowledge of the specific access patterns that will be seen. As previously noted, these contention problems may be reduced by allowing an execution unit to reserve certain physical memory resources.

Figure 4:
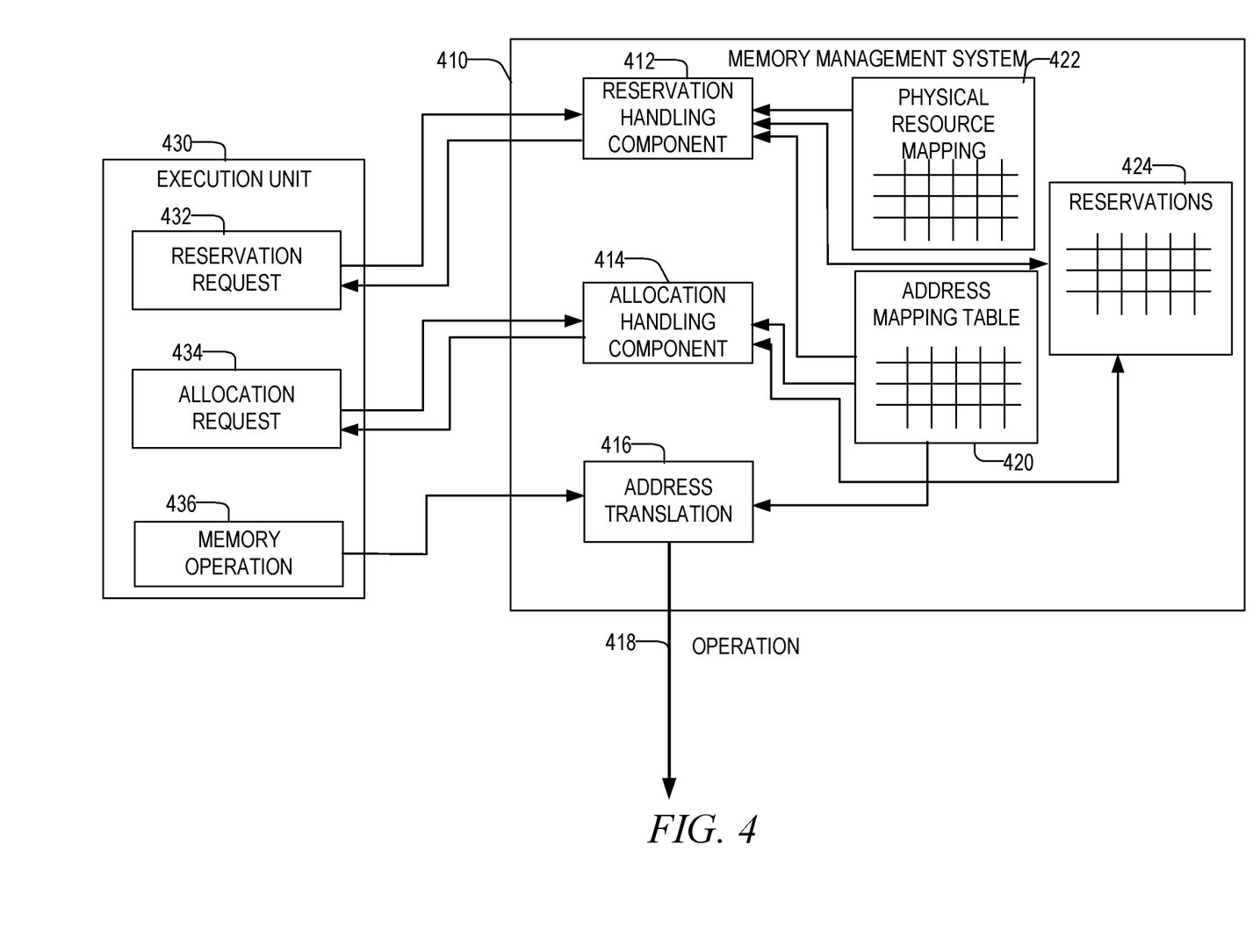
FIG. 4 illustrates a memory management system which allows for reservations of physical memory resources according to some examples of the present disclosure.

FIG. 4 illustrates a memory management system 410 which allows for reservations of physical memory resources according to some examples of the present disclosure. Memory management system 410 may be an example logical diagram of memory management system 140. In some examples, memory management functions not relevant to the present disclosure have been omitted, but one of ordinary skill in the art will appreciate that the memory management system 410 may include other components that provide additional functionality for management of the memory system. Additionally, as previously noted, the memory management system 410 may be implemented by hardware, software, or a combination of hardware and software; as well as being implemented by a hardware processing unit, memory management unit, an operating system, a memory controller, or a combination.

As previously noted, the reservation system may be accomplished by identifying the set of physical addresses that correspond to a particular physical memory resource that is reserved—such as a bank. Physical memory addresses that map to a particular physical resource may then be reserved for the reserving execution unit. Memory allocation requests for the reserving execution unit may be fulfilled with the reserved addresses. Memory allocation requests for other execution units may not be fulfilled with the reserved addresses. For systems with virtual memory, when an execution unit with reserved resources has a page fault and the page is loaded into memory, the page may be loaded into the reserved physical memory resources using the reserved physical addresses and the virtual address for that page may be assigned to the reserved physical address in which the page was loaded.

In other examples, the reservation may be enforced at the memory modules. For example, the memory modules may include additional circuitry that converts a physical address to a different bank, bank group, row and/or column to ensure the reservation is respected. In these examples, additional address bits may be sent to the memory module which may utilize these to identify reservations and manage the placement of data to ensure that the reservations of one or more physical resources are respected.

An execution unit 430, may be executing on a computer system in which a memory system may be present. The execution unit 430 may be any related set of instructions for execution by a processor. Examples include a thread, a process, an application, a virtual machine, or the like. The execution unit 430, or an operating system on behalf of the execution unit 430, may request a reservation of a particular physical memory resource. In some examples, the reservable physical memory resources may include banks, bank groups, ranks, channels, or the like.

The reservation request component 432 of the execution unit 430 may utilize an application programming interface (API) to request a physical memory resource from the memory management system 410. In some examples, the unit of the physical memory resource that may be requested is fixed. For example, one or more banks may be requested, but not bank groups. In other examples, the execution unit 430 may request different physical memory resource units. For example, the execution unit 430 may choose whether it wants a bank, a bank group, a rank, or the like. In some examples, the execution unit 430 may request both a bank, and a bank group. In some examples, the execution unit 430 may be limited to a particular maximum amount of reserved physical memory resources to avoid allowing an execution unit to take up all the memory resources.

The reservation request may be handled by the reservation handling component 412 in the memory management system 410. The reservation handling component 412 may utilize a reservations table 424 to identify existing reservations of physical resources; a physical resource mapping table 422 which maps physical memory resources to physical addresses; and an address mapping table 420 that identifies currently used physical addresses to determine whether to grant the reservation, and if so, which particular resources to grant. For example, the reservation handling component 412 may first identify unreserved physical resources from the reservations table 424. This may produce a candidate list of unreserved physical resources. From this candidate list, the physical resource mapping table 422 may be used to produce a list of physical addresses for each of the unreserved physical resources in the candidate list. The reservation handling component 412 may then remove any physical resources in the candidate list which have physical addresses in use using the address mapping table 420 (e.g., a physical address is assigned to a virtual address). The memory management system may then allocate one of the remaining physical memory resources in the candidate list.

If there are no free (or not enough) unreserved physical resources, then the reservation handling component 412 may return an error. If there are free unreserved physical resources, the reservation handling component 412 may select one of the unreserved and unused physical resources based upon a selection algorithm and mark any unused physical addresses mapped to the selected unused physical resource as reserved. The reservation handling component 412 may then mark the selected unreserved physical resources as reserved for the execution unit 430. In some examples, the reservation handling component 412 may also mark the physical addresses corresponding to the reserved physical resources as reserved in the address mapping table 420. In some examples, this may include indicating in the address mapping table 420 a reference to the reservation or the execution unit for which those addresses are reserved.

In some examples, if a physical memory resource is not completely unused, the physical resources may be partially reserved for the execution unit 430. While not completely reserved, this may reduce contention to only a few execution units. In some examples, as the remaining used space on a reserved physical resource that is not held by the execution unit that reserved it (e.g., execution unit 430) is freed up, that space may not be reallocated to any other execution units other than execution unit 430. Thus, the reservation may be completed gradually and over time. This may assist in reserving physical memory resources in systems with lots of execution units executing in parallel. In still other examples, the remaining used space on a reserved physical resource that is not held by the execution unit 430 may be immediately moved to other physical resources. In these examples, the system may choose a physical memory resource with the fewest allocated physical addresses, to speed up the completion of the reservation of that physical memory resource and to reduce the contention until the reservation is completed.

In some examples, an entire physical memory resource may be reserved. In other examples, only part of a physical memory resource may be reserved. For example, while not eliminating contention, a partial reservation may reduce the amount of contention.

If the reservation succeeds, either by finding a physical resource that is free and unreserved, by moving any memory allocations presently on an unreserved resource, or by granting a partially reserved resource—the reservation handling component may return a reservation identifier to the reservation request component 432 of the execution unit 430. Additionally, the reservation handling component 412 may mark the reservation in the reservations table 424 and mark the physical addresses corresponding to that physical resource as reserved in the address mapping table.

In some examples, the operating system may place the reservation request and may then place the execution unit 430 within the memory space that was reserved. E.g., by loading pages corresponding to the instructions in the execution unit 430 into the reserved memory. In other examples, the execution unit 430 may request the reservation and use the reservation for particular memory allocations (but not all memory allocations). For example, the execution unit may have particular data that must be accessed quickly, and any contention may slow the execution unit down considerably. However, there may be other data that may be infrequently accessed and a short wait for that data may not be a problem. In these examples, the execution unit 430 may put the data that is sensitive to delay in the reserved resources and may allow the other data that is not sensitive to delay in common resources.

Execution unit 430 may request one or more memory addresses associated with its reservation. For example, an allocation request component 434 may request one or more memory resources. If the execution unit 430 is exclusively using the reserved physical resources (e.g., it was loaded into the memory corresponding to the reserved physical resources by the operating system), the request for the reserved resources may be indistinguishable from a normal memory request. In other examples, if the execution unit 430 is using both reserved and unreserved resources, the execution unit 430 may request an allocation of memory and pass in the reservation identifier.

Allocation handling component 414 may utilize the reservations table 424 to check to ensure that the reservation identifier is valid and is assigned to the execution unit 430. This security check may prevent other execution units from interfering with the reservation. The allocation handling component 414 also identifies the physical resources that are part of the reservation using the reservations table 424. Additionally, the allocation handling component 414 may check the physical resource mapping table 422 to find the set of physical addresses associated with the reservation. The allocation handling component 414 may then determine free memory addresses that map to the physical resources of the reservation. Free memory addresses may then be used to satisfy the allocation request and may be marked as utilized (e.g., in the address mapping table 420). For systems that utilize virtual addresses, the allocation handling component may then create one or more virtual addresses and register them in the address mapping table as mapping to one or more physical addresses associated with the physical resources. The allocation handling component 414 may then return the allocated memory addresses (either physical or virtual). If there are not enough free resources within the reservation, the allocation handling component 414 may return an error.

In some example systems, memory associated with the execution unit 430 and stored in the reserved physical memory resources may be swapped out of physical memory. In these examples, virtual addresses that are used will no longer be associated with a physical address of a reserved physical memory resource in the address mapping table 420 and will instead point toward a location in non-volatile storage where the page holding that memory is stored. Once values or other data associated with the virtual address are again needed in memory—e.g., as a result of execution unit 430 using those values or memory, the memory management system 410 may load the page from nonvolatile storage, evict a different page from the reserved physical memory, and load the page into the physical memory space previously allocated to the different page in the reserved physical memory. The system may preserve the allocation of the reserved physical resources for these pages.

In other examples, the execution unit 430 or operating system may specify whether a memory page is only to be loaded into reserved physical memory or may also be loaded into non-reserved physical memory if reserved space is not available. For example, an execution unit 430 may wish to avoid evicting other, higher priority, pages stored in the reserved physical memory and may be fine using non-reserved physical memory resources for lower priority pages. In some examples, this preference may be passed to the memory management system 410 in an allocation request and may be stored in the address mapping table 420.

Once the memory is allocated, the execution unit 430 may then utilize the allocated memory by initiating a memory operation 436, such as a load, store, or the like using the assigned address. For virtual addresses, the memory operation with the address may be sent to the address translation component 416 of the memory management system 410 which may utilize the address mapping table 420 to convert the address to a physical address. The physical address is then used to issue the memory operation 418.

In other examples, the reservations may be handled on the memory module by changing where physical addresses are mapped. For example, extra bits may be added to the physical address passed from the memory management system or additional signals may be sent to the memory modules. This extra information may identify either a reservation (which may then be used to identify one or more physical resources) or may be used to directly identify the physical resources. For reservations, if the reservation system is being implemented by the memory modules the memory management system may pass the reservation request to the memory modules using a memory command (e.g., indicated by a combination of high/low command lines along with data for the command in the data lines), or the like. The memory module may then implement the reservations table 424 and/or the physical resource mapping table 422. For memory operations, the memory module may check to determine if a reservation number or other signal indicating a reservation number was included with the address of a memory operation. If there is no reservation number or other signal, the memory controller or module may route memory operation to physical memory resources that are not reserved. If there is a reservation number or other signal, the memory controller or module may route the memory operation to physical memory resources associated with the reservation. If a physical address assigned to a reserved physical memory resource is received without a reservation number, the physical address may be routed to different physical memory resources. That is, the physical memory resources normally assigned for that physical address may be overridden.

Figure 5:
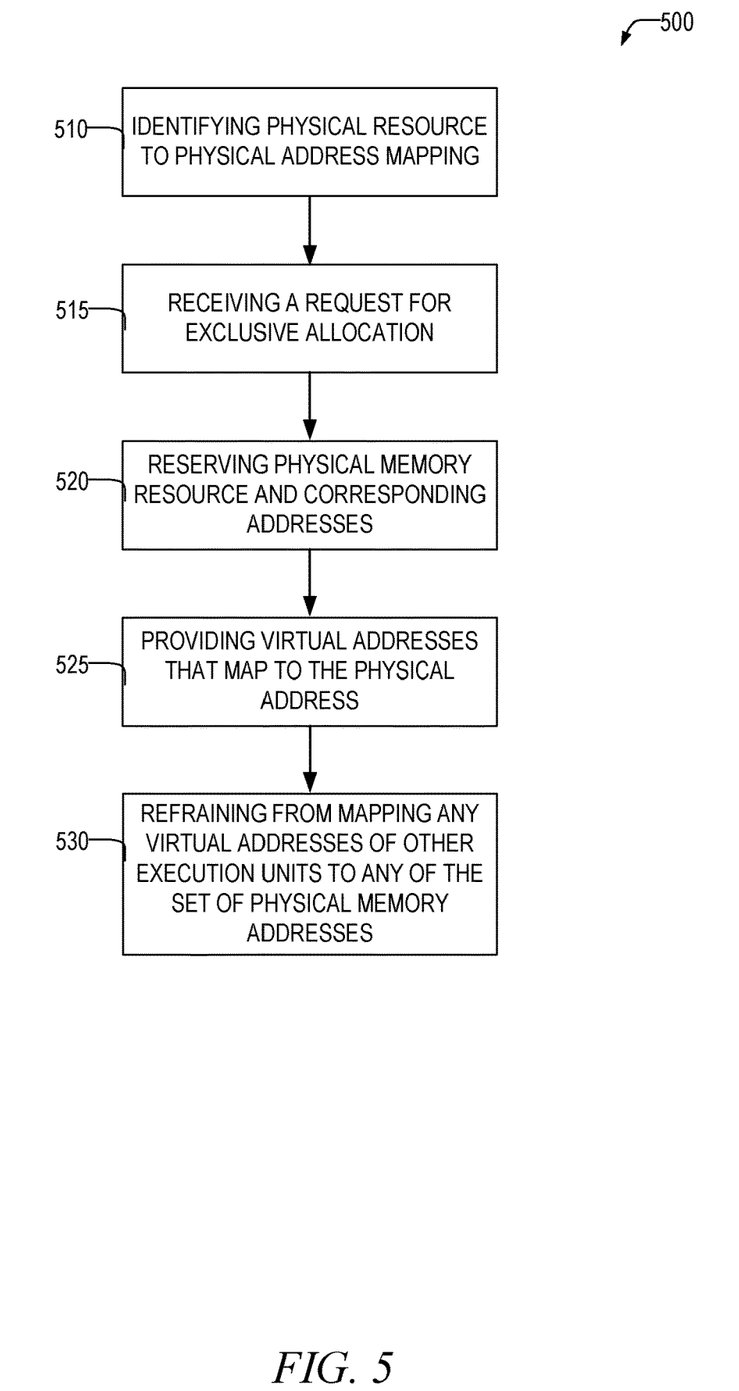
FIG. 5 illustrates a flowchart of a method of providing reserved physical resources to an execution unit according to some examples of the present disclosure.

FIG. 5 illustrates a flowchart of a method 500 of providing reserved physical resources to an execution unit according to some examples of the present disclosure. At operation 510 the system may identify a physical resource to physical address mapping. That is, the system identifies which physical memory resources map to which physical addresses. For example, certain address ranges may map to certain banks, bank groups, or the like. This may be determined by querying the memory modules to identify the physical memory resources, as well as from the memory controller to identify the mapping between physical addresses and resources. The mapping may describe the structure of the memory device and how a physical address is translated to physical memory resources. This may be a list of physical addresses and an identification of the physical resources to which the address references.

At operation 515, a request for an exclusive allocation of one or more physical resources may be received. The request may be received from an execution unit or an operating system. If the system has enough free physical memory resources, then at operation 520, the system may reserve one or more physical resources based upon the request. In some examples, this may also include marking the physical addresses associated with those physical resources as reserved to ensure that other execution units are not provided with memory addresses that would be stored in the reserved physical addresses.

At operation 525, the system may provide one or more virtual addresses that map to physical addresses with the reserved physical resources to the requesting execution unit. For example, if the execution unit desires one or more addresses within the reserved allocation, the system may provide one or more virtual addresses that maps to the physical addresses that reference the reserved physical memory resources.

At operation 530, the system may refrain from allocating, or mapping any virtual addresses for other execution units to any of the set of physical memory addresses that are reserved. For example, if another execution unit allocates memory, or if a page of memory for another execution unit is moved from storage to the memory system, the system may assign that memory to a physical address that is not reserved for another execution unit.

Figure 6:
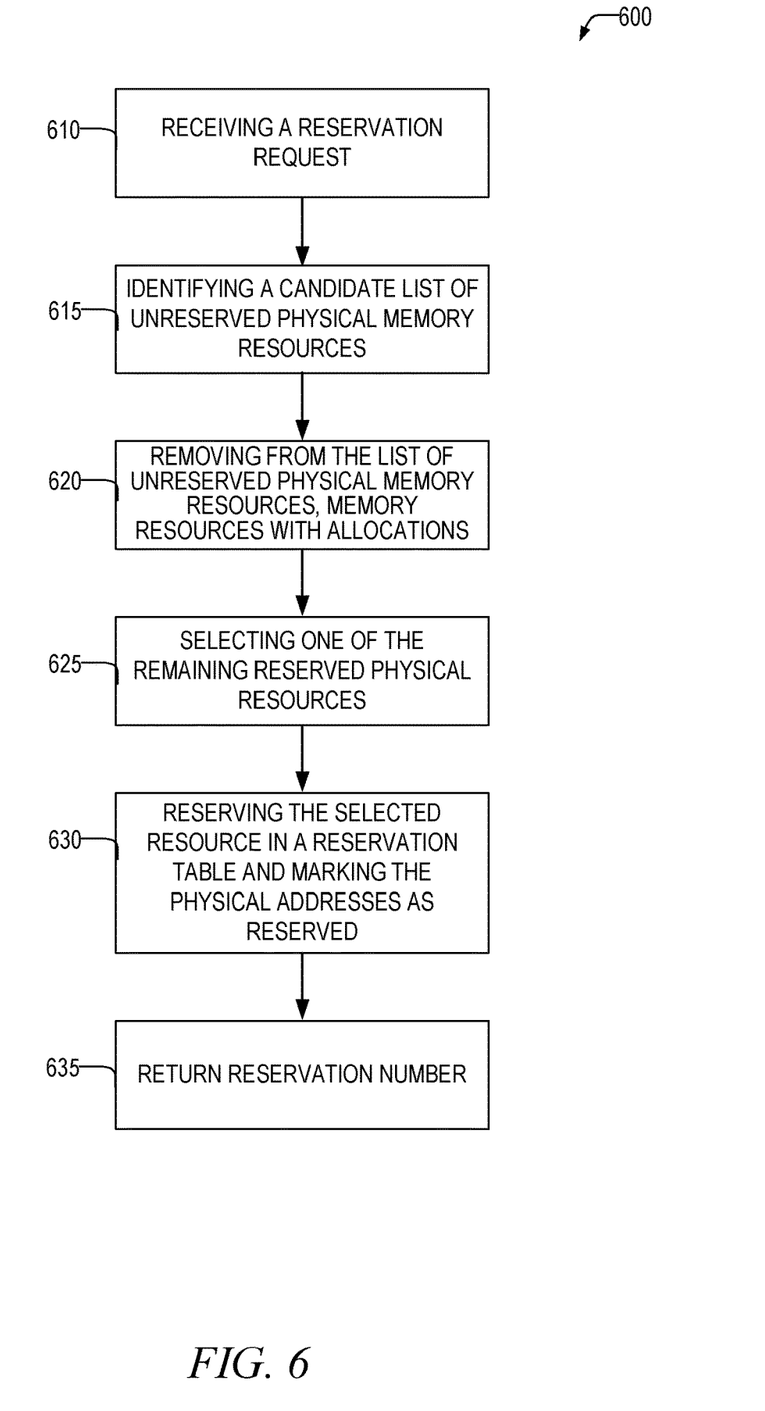
FIG. 6 illustrates a flowchart of a method of reserving a physical memory resource, according to some examples of the present disclosure.

FIG. 6 illustrates a flowchart of a method 600 of reserving a physical memory resource, according to some examples of the present disclosure. In some examples, the method 600 is an example of operation 515 of FIG. 5. At operation 610 the memory control system may receive a reservation request that requests a reservation of one or more physical memory resources. In some examples, if the request is for multiple physical memory resources, the request may be fulfilled with contiguous or non-contiguous resources. The reservation request may be from an execution unit, an operating system, or the like. The reservation request may be made using an API function call, a processor instruction, or the like.

At operation 615 the memory control system may utilize a reservations table (such as reservations table 424) to identify a candidate list of physical memory resources that are not already subject to a reservation. At operation 620, the memory control system may identify those memory resources on the candidate list that, while not reserved, already have data stored therein, e.g., for other execution units and remove those memory resources from the candidate list. In some examples, memory resources already storing data for the reserving execution unit may not be removed from the candidate list. In other examples, memory resources already storing data for the reserving execution unit may be removed. This may be done using the physical resource mapping table and/or the address mapping table. While separate tables may be used, and are shown in FIG. 4, and discussed with respect to FIGS. 5-7, in other examples, the information in the tables may be consolidated to one or two tables or may be spread across more than three tables. While tables are used herein, one of ordinary skill in the art with the benefit of the present disclosure will appreciate that other data structures may be used.

At operation 625, the memory control system may select one or more of the remaining reserved physical resources in the candidate list that are collectively large enough to fulfil the reservation request. For example, the first reserved physical resources in the list may be selected. In other examples, the reserved physical resources with physical addresses furthest (in terms of address) from physical addresses used by other execution units may be selected— e.g., to increase the chance of being able to allocate additional contiguous memory for the other execution units in case the other execution units need additional memory.

At operation 630, the memory control system may reserve the selected resource in a reservation table and mark the corresponding physical addresses as reserved in an allocation table. In some examples, a reservation number may be returned at operation 635 that may be used by the execution unit or the operating system to allocate the reserved memory. In other examples, an identifier of the execution unit may be stored in the reservation table, and/or the allocation table to denote that only that execution unit may obtain the reserved addresses.

Figure 7:
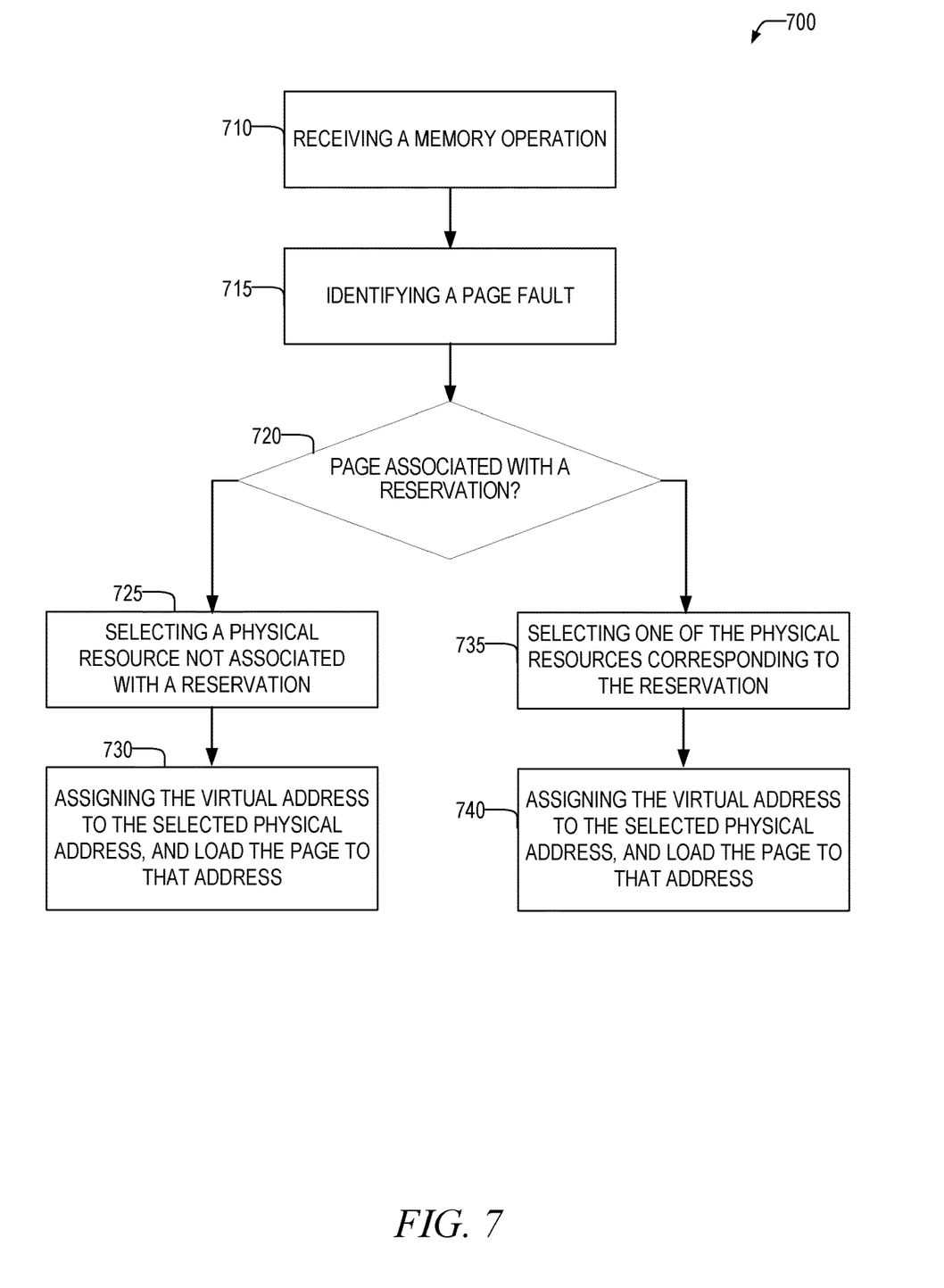
FIG. 7 illustrates a flowchart of a method of processing memory operations using a reservation system according to some examples of the present disclosure.

FIG. 7 illustrates a flowchart of a method 700 of processing memory operations using a reservation system according to some examples of the present disclosure. At operation 710 the memory control system receives a memory operation directed to a virtual address. For example, a load, a store, or the like. At operation 715, the memory system determines if the memory location referenced by the operation is currently in main memory. If not, then the system identifies a page fault at operation 715. If the memory location is in main memory, then the operation is issued to the memory system. Once a page fault is detected then at operation 720, the system may determine if the page is associated with a reservation. For example, metadata of the page may indicate that it is part of a reservation and may identify the reservation. In other examples the table storing the mapping between the virtual and physical (e.g., the address mapping table 420 if FIG. 4), may indicate that the virtual address is assigned to a reservation.

If the virtual address is not associated with a reservation, then at operation 725 the memory control system may select a physical address corresponding to a physical resource that is not reserved by another execution unit. For example, by selecting a physical address that is not marked as reserved in the address mapping table, or by utilizing both the reservation table and the physical resource mapping table to identify memory addresses not subject to a reservation. For example, the reserved physical resources may be retrieved from the reservation table and the physical addresses for each of these reserved resources may be identified from the physical resource mapping table. At operation 730, the virtual address may be assigned to the selected physical address and the page may be loaded, and the operation executed on the page.

If the virtual address is associated with a reservation, then at operation 735, the memory control system may select one of the physical resources corresponding to the reservation. For example, by selecting a physical address marked as reserved for that execution unit or reservation number in the address mapping table, or by utilizing the reservation table able to find the reservation and then the physical resource mapping table to find the physical addresses associated with that reservation. At operation 740, the virtual address may be assigned to the selected physical address and the page may be loaded, and the operation executed on the page.

Figure 8:
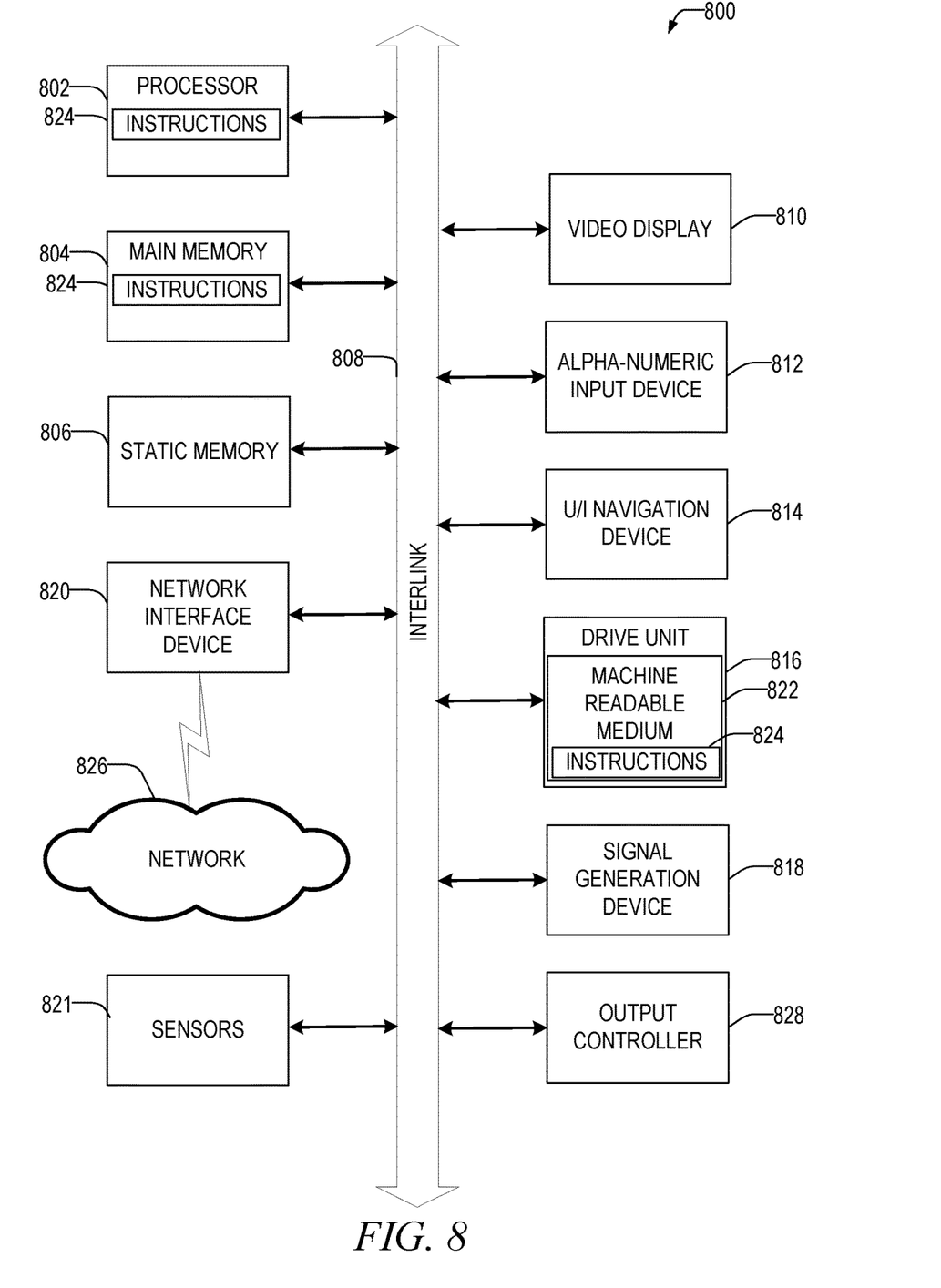
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In some examples, the processor 802 may be an example of hardware processing unit 110; and main memory 804 may be examples of memory modules 127, 129, 131, and 133.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a method comprising: identifying, for each of a plurality of physical memory resources of a random-access memory device a corresponding set of physical memory addresses; receiving a request for an execution unit for a physical memory resource of the plurality of physical memory resources to be assigned to the execution unit, the allocation requesting a reservation of the corresponding set of physical memory addresses corresponding to the physical memory resource for the execution unit; reserving the physical memory resource and the corresponding set of physical memory addresses for exclusive use of the execution unit; providing, to the execution unit, one or more virtual addresses that map to the corresponding set of physical memory addresses; and refraining from mapping any virtual addresses of other execution units to any of the set of physical memory addresses.

In Example 2, the subject matter of Example 1 includes, wherein the execution unit comprises: a virtual machine, a process, a thread, or any combination thereof.

In Example 3, the subject matter of Examples 1-2 includes, responsive to receiving the request: identifying a candidate list of unreserved physical memory resources from a list of reserved physical memory reservations; removing unreserved physical memory resources with current memory allocations based upon an address mapping table indicating current memory allocations; and selecting the physical memory resource from the remaining unreserved physical memory resources.

In Example 4, the subject matter of Examples 1-3 includes, wherein the method is performed by an operating system.

In Example 5, the subject matter of Examples 1-4 includes, wherein the method is performed by a memory controller.

In Example 6, the subject matter of Examples 1-5 includes, wherein the method is performed by an operating system and a memory controller.

In Example 7, the subject matter of Examples 1-6 includes, wherein the physical memory resources are bank groups.

In Example 8, the subject matter of Examples 1-7 includes, wherein the physical memory resources are banks.

In Example 9, the subject matter of Examples 1-8 includes, wherein the method further comprises: assigning an identifier for the exclusive allocation; and wherein the virtual addresses include the identifier.

Example 10 is a device comprising: a random-access memory device comprising a plurality of physical memory resources; and a hardware processor, configured to perform operations comprising: identifying, for each of the plurality of physical memory resources of the random-access memory device a corresponding set of physical memory addresses; receiving a request for an execution unit for a physical memory resource of the plurality of physical memory resources to be assigned to the execution unit, the allocation requesting a reservation of the corresponding set of physical memory addresses corresponding to the physical memory resource for the execution unit; reserving the physical memory resource and the corresponding set of physical memory addresses for exclusive use of the execution unit; providing, to the execution unit, one or more virtual addresses that map to the corresponding set of physical memory addresses; and refraining from mapping any virtual addresses of other execution units to any of the set of physical memory addresses.

In Example 11, the subject matter of Example 10 includes, wherein the execution unit comprises: a virtual machine, a process, a thread, or any combination thereof.

In Example 12, the subject matter of Examples 10-11 includes, wherein the hardware processor is further configured to perform operations comprising: responsive to receiving the request: identifying a candidate list of unreserved physical memory resources from a list of reserved physical memory reservations; removing unreserved physical memory resources with current memory allocations based upon an address mapping table indicating current memory allocations; and selecting the physical memory resource from the remaining unreserved physical memory resources.

In Example 13, the subject matter of Examples 10-12 includes, wherein the operations are performed by an operating system.

In Example 14, the subject matter of Examples 10-13 includes, wherein the hardware processor includes a memory controller.

In Example 15, the subject matter of Examples 10-14 includes, wherein the operations are performed by an operating system and a memory controller included in the hardware processor.

In Example 16, the subject matter of Examples 10-15 includes, wherein the physical memory resources are bank groups.

In Example 17, the subject matter of Examples 10-16 includes, wherein the physical memory resources are banks.

In Example 18, the subject matter of Examples 10-17 includes, wherein the hardware processor is further configured to perform operations comprising: assigning an identifier for the exclusive allocation; and wherein the virtual addresses include the identifier.

Example 19 is a non-transitory machine-readable medium, storing instructions, which when executed by a machine, cause the machine to perform operations comprising: identifying, for each of a plurality of physical memory resources of a random-access memory device a corresponding set of physical memory addresses; receiving a request for an execution unit for a physical memory resource of the plurality of physical memory resources to be assigned to the execution unit, the allocation requesting a reservation of the corresponding set of physical memory addresses corresponding to the physical memory resource for the execution unit; reserving the physical memory resource and the corresponding set of physical memory addresses for exclusive use of the execution unit; providing, to the execution unit, one or more virtual addresses that map to the corresponding set of physical memory addresses; and refraining from mapping any virtual addresses of other execution units to any of the set of physical memory addresses.

In Example 20, the subject matter of Example 19 includes, wherein the execution unit comprises: a virtual machine, a process, a thread, or any combination thereof.

In Example 21, the subject matter of Examples 19-20 includes, wherein the operations further comprise: responsive to receiving the request: identifying a candidate list of unreserved physical memory resources from a list of reserved physical memory reservations; removing unreserved physical memory resources with current memory allocations based upon an address mapping table indicating current memory allocations; and selecting the physical memory resource from the remaining unreserved physical memory resources.

In Example 22, the subject matter of Examples 19-21 includes, wherein the operations are performed by an operating system.

In Example 23, the subject matter of Examples 19-22 includes, wherein the operations are performed by a memory controller.

In Example 24, the subject matter of Examples 19-23 includes, wherein the operations are performed by an operating system and a memory controller.

In Example 25, the subject matter of Examples 19-24 includes, wherein the physical memory resources are bank groups.

In Example 26, the subject matter of Examples 19-25 includes, wherein the physical memory resources are banks.

In Example 27, the subject matter of Examples 19-26 includes, wherein the operations further comprise: assigning an identifier for the exclusive allocation; and wherein the virtual addresses include the identifier.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

What is claimed is:

1. A method comprising:
   using a hardware processor within a computer memory system:
   identifying, for each particular physical memory resource of a plurality of physical memory resources of a random-access memory device a corresponding set of physical memory addresses that describe memory within the particular physical memory resource, the physical memory resource comprises one of a channel, module, rank, bank, or bank group;
   receiving a request from an execution unit for a physical memory resource of the plurality of physical memory resources to be assigned exclusively to the execution unit, the allocation requesting a reservation of the corresponding set of physical memory addresses corresponding to the physical memory resource for the execution unit;
   identifying a physical memory resource of the plurality of physical memory resources based upon the identified set of physical memory addresses for each of the particular physical memory resources, a reservations data structure that includes prior reservations, and an address mapping table that identifies in-use memory;
   reserving the identified physical memory resource and the corresponding set of physical memory addresses for exclusive use of the execution unit;
   providing, to the execution unit, one or more virtual addresses that map to the corresponding set of physical memory addresses; and
   refraining from mapping any virtual addresses of other execution units to any of the set of corresponding physical memory addresses.

2. The method of claim 1, wherein the execution unit comprises: a virtual machine, a process, a thread, or any combination thereof.

3. The method of claim 1, wherein identifying the physical memory resource further comprises:
   identifying a candidate list of unreserved physical memory resources from a list of reserved physical memory reservations in the reservations data structure;
   removing unreserved physical memory resources with current memory allocations based upon the address mapping table indicating current memory allocations; and
   selecting the physical memory resource from the remaining unreserved physical memory resources.

4. The method of claim 1, wherein the method is performed by an operating system.

5. The method of claim 1, wherein the method is performed by a memory controller.

6. The method of claim 1, wherein the method is performed by an operating system and a memory controller.

7. The method of claim 1, wherein the method further comprises:
assigning an identifier for the exclusive allocation; and
wherein the virtual addresses include the identifier.

8. A computing device comprising:
a random-access memory device comprising a plurality of physical memory resources; and
a hardware processor, configured to perform operations comprising:
identifying, for each particular physical memory resource of the plurality of physical memory resources of the random-access memory device a corresponding set of physical memory addresses, that describe memory within the particular physical memory resource, the physical memory resource comprises one of a channel, module, rank, bank, or bank group;
receiving a request from an execution unit for a physical memory resource of the plurality of physical memory resources to be assigned exclusively to the execution unit, the allocation requesting a reservation of the corresponding set of physical memory addresses corresponding to the physical memory resource for the execution unit;
identifying a physical memory resource of the plurality of physical memory resources based upon the identified set of physical memory addresses for each of the particular physical memory resources, a reservations data structure that includes prior reservations, and an address mapping table that identifies in-use memory;
reserving the identified physical memory resource and the corresponding set of physical memory addresses for exclusive use of the execution unit;
providing, to the execution unit, one or more virtual addresses that map to the corresponding set of physical memory addresses; and
refraining from mapping any virtual addresses of other execution units to any of the set of corresponding physical memory addresses.

9. The device of claim 8, wherein the execution unit comprises: a virtual machine, a process, a thread, or any combination thereof.

10. The device of claim 8, wherein the operations of identifying the physical memory resource comprise:
identifying a candidate list of unreserved physical memory resources from a list of reserved physical memory reservations in the reservations data structure;
removing unreserved physical memory resources with current memory allocations based upon the address mapping table indicating current memory allocations; and
selecting the physical memory resource from the remaining unreserved physical memory resources.

11. The device of claim 8, wherein the operations are performed by an operating system.

12. The device of claim 8, wherein the hardware processor includes a memory controller.

13. The device of claim 8, wherein the operations are performed by an operating system and a memory controller included in the hardware processor.

14. The device of claim 8, wherein the hardware processor is further configured to perform operations comprising:
assigning an identifier for the exclusive allocation; and
wherein the virtual addresses include the identifier.

15. A non-transitory machine-readable medium, storing instructions, which when executed by a machine, cause the machine to perform operations comprising:
identifying, for each particular physical memory resource of a plurality of physical memory resources of a random-access memory device a corresponding set of physical memory addresses that describe memory within the particular physical memory resource, the physical memory resource comprises one of a channel, module, rank, bank, or bank group;
receiving a request from an execution unit for a physical memory resource of the plurality of physical memory resources to be assigned exclusively to the execution unit, the allocation requesting a reservation of the corresponding set of physical memory addresses corresponding to the physical memory resource for the execution unit;
identifying a physical memory resource of the plurality of physical memory resources based upon the identified set of physical memory addresses for each of the particular physical memory resources, a reservations data structure that includes prior reservations, and an address mapping table that identifies in-use memory;
reserving the identified physical memory resource and the corresponding set of physical memory addresses for exclusive use of the execution unit;
providing, to the execution unit, one or more virtual addresses that map to the corresponding set of physical memory addresses; and
refraining from mapping any virtual addresses of other execution units to any of the set of corresponding physical memory addresses.

16. The non-transitory machine-readable medium of claim 15, wherein the execution unit comprises: a virtual machine, a process, a thread, or any combination thereof.

* * * * *